United States Patent
Kim

(10) Patent No.: US 8,406,312 B2
(45) Date of Patent: Mar. 26, 2013

(54) BROADCASTING PROCESSING APPARATUS AND CONTROL METHOD THEREOF

(75) Inventor: Je-ik Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1507 days.

(21) Appl. No.: 11/947,283

(22) Filed: Nov. 29, 2007

(65) Prior Publication Data

US 2009/0015724 A1   Jan. 15, 2009

(30) Foreign Application Priority Data

Jul. 9, 2007   (KR) .................. 10-2007-0068576

(51) Int. Cl.
*H04N 7/12* (2006.01)
(52) U.S. Cl. .......... 375/240.26; 375/240.15; 375/240.28
(58) Field of Classification Search ............. 375/240.03, 375/240.13, 240.15, 240.28, 240.26
See application file for complete search history.

(56) References Cited

U.S. PATENT DOCUMENTS

| | | | |
|---|---|---|---|
| 7,127,156 B1 * | 10/2006 | Togashi et al. ............... 386/330 |
| 2003/0151529 A1 * | 8/2003 | Karczewicz ..................... 341/51 |
| 2005/0168590 A1 * | 8/2005 | Takizawa et al. ........... 348/222.1 |
| 2005/0246372 A1 * | 11/2005 | Yamaki ....................... 707/104.1 |
| 2006/0184981 A1 * | 8/2006 | Suh ................................... 725/88 |
| 2007/0058730 A1 * | 3/2007 | Bowra et al. ............. 375/240.28 |
| 2007/0112751 A1 * | 5/2007 | Pyun .................................. 707/4 |
| 2007/0285573 A1 * | 12/2007 | Ichikawa ...................... 348/571 |
| 2008/0107178 A1 * | 5/2008 | Han et al. ................. 375/240.15 |

* cited by examiner

*Primary Examiner* — Hassan Phillips
*Assistant Examiner* — Ajay Cattungal
(74) *Attorney, Agent, or Firm* — Sughrue Mion, PLLC

(57) ABSTRACT

A broadcasting processing apparatus, includes: a receiver which receives an image signal; a storage unit; a decoder which decodes the image signal; a channel selection unit which is provided to select a channel; and a controller which determines whether sequence header information exists in the image signal received through the receiver and stores the sequence header information in the storage unit if the sequence header information exists in the image signal, and controls the decoder to decode the image signal by using sequence header information of the selected channel pre-stored in the storage unit if the sequence header information does not exist, if a selection signal to select the channel is inputted through the channel selection unit.

3 Claims, 6 Drawing Sheets

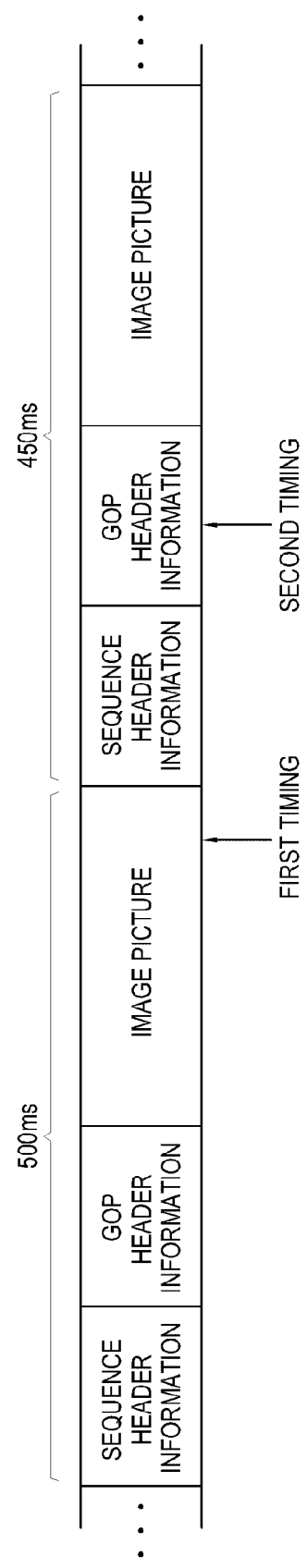

BROADCASTING PROCESSING APPARATUS AND CONTROL METHOD THEREOF

CROSS-REFERENCE TO RELATED APPLICATIONS

This application claims priority from Korean Patent Application No. 10-2007-0068576, filed on Jul. 9, 2007 in the Korean Intellectual Property Office, the disclosure of which is incorporated herein by reference.

BACKGROUND OF THE INVENTION

1. Field of the Invention

Apparatuses and methods consistent with the present invention relate to a broadcasting processing apparatus and a control method thereof, and more particularly, to a broadcasting processing apparatus which processes an image according to a motion picture expert group (MPEG) standard, and a control method thereof.

2. Description of the Related Art

With the recent advancement in digital broadcasting technology, a user receives a high quality image signal compared to analog broadcasting. In digital broadcasting, a video/audio signal is encoded as a digital signal according to a predetermined standard, e.g. a motion picture expert group (MPEG) standard, to be transmitted to a display apparatus. Then, the display apparatus decodes the transmitted video/audio signal according to the standard and displays an image corresponding thereto.

According to the MPEG standard, approximately 15 frame pictures form a single group of pictures (GOP). At least one GOP forms a sequence. An image signal which is transmitted to the display apparatus includes a plurality of header information. Sequence header information, which is one of header information, should be received so that the image signal substantially is decoded.

If the sequence header information is not received at a time a user selects a channel, the image signal could be not decoded until subsequent sequence header information is supplied. That is, as the image signal is not immediately displayed on the display apparatus when the channel is selected or changed, a user recognizes that the channel is not changed quickly. Moreover, if a single sequence includes a plurality of GOPs, the image signal-decoding operation may be delayed further.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

Accordingly, it is an aspect of the present invention to provide a broadcasting processing apparatus which changes a channel quickly, and a control method thereof.

Also, it is another aspect of the present invention to provide a broadcasting processing apparatus which reduces decoding time of a broadcasting signal, and a control method thereof.

Additional aspects of the present invention will be set forth in part in the description which follows and, in part, will be obvious from the description, or may be learned by practice of the present invention.

The foregoing and/or other aspects of the present invention can be achieved by providing a broadcasting processing apparatus, including: a receiver which receives an image signal; a storage unit; a decoder which decodes the image signal; a channel selection unit which is provided to select a channel; and a controller which determines whether sequence header information exists in the image signal received through the receiver and stores the sequence header information in the storage unit if the sequence header information exists in the image signal, and controls the decoder to decode the image signal by using sequence header information of the selected channel prestored in the storage unit if the sequence header information does not exist, if a selection signal to select the channel is inputted through the channel selection unit.

According to an aspect of the present invention, the controller determines validity of the sequence header information prestored in the storage unit and decodes the image signal if it is determined that the sequence header information is valid.

According to an aspect of the present invention, the image signal includes an intra I picture, a prediction P picture and a bi-direction B picture, and the controller decodes the I picture by using the prestored sequence header information, and determines whether the number of image blocks from the decoded I picture corresponds to the preset number.

According to an aspect of the present invention, the controller determines whether group of pictures (GOP) header information exists if the supplied image signal does not include the sequence header information, and controls the decoder to decode the image signal by using the stored sequence header information if the GOP header information exists.

The foregoing and/or other aspects of the present invention can be achieved by providing a broadcasting processing apparatus, including: a receiver which receives an image signal; a storage unit; a decoder which decodes the image signal; a channel selection unit which is provided to select a channel; and a controller which determines whether sequence header information exists in the image signal received through the receiver and stores the sequence header information in the storage unit if the sequence header information exists, and updates prestored sequence header information of the selected channel, if a selection signal to select the channel is inputted through the channel selection unit.

According to an aspect of the present invention, if the selection signal is inputted to reselect the channel having the prestored sequence header information, the controller determines whether the received image signal includes the sequence header information, and controls the decoder to decode the image signal by using the prestored sequence header information of the channel if the sequence header information does not exist.

The foregoing and/or other aspects of the present invention can be achieved by providing a broadcasting processing apparatus, including: a receiver which receives an image signal; a storage unit which stores sequence header information on at least one channel; a decoder which decodes the image signal; a channel selection unit which is provided to select a channel; and a controller which determines whether the sequence header information exists in the image signal received through the receiver, and controls the decoder to decode the image signal by using prestored sequence header information of a selected channel if the sequence header information does not exist, when a selection to select the channel signal is inputted through the channel selection unit.

According to an aspect of the present invention, the controller determines validity of the sequence header information prestored in the storage unit, and decodes the image signal if it is determined that the sequence header information is valid.

According to an aspect of the present invention, the image signal includes an intra I picture, a prediction P picture and a bi-direction B picture, and the controller decodes the I picture by using the prestored sequence header information, and determines whether the number of image blocks from the decoded I picture corresponds to the preset number.

The foregoing and/or other aspects of the present invention can be achieved by providing a method of controlling a broadcasting processing apparatus, including: receiving a selection signal to select a channel; parsing an image signal supplied through the selected channel and extracting image header information therefrom; determining whether sequence header information exists in the extracted image header information; and storing the sequence header information according to channels if the sequence header information exists, and decoding the image signal by using prestored sequence header information of the channel if the sequence header information does not exist.

According to an aspect of the present invention, the method further includes determining validity of the prestored sequence header information.

According to an aspect of the present invention, the image signal includes an intra I picture, a prediction P picture and a bi-direction B picture, and the determining the validity of the sequence header information includes decoding the I picture by using the sequence header information and determining whether the number of image blocks from the decoded I picture corresponds to the preset number.

According to an aspect of the present invention, the method further includes: determining whether group of pictures (GOP) header information exists in the extracted image header information if the sequence header information does not exist, and decoding the image signal if the GOP header information exists.

BRIEF DESCRIPTION OF THE DRAWINGS

The above and/or other aspects of the present invention will become apparent and more readily appreciated from the following description of the embodiments, taken in conjunction with the accompany drawings of which:

FIGS. 3A and 3B illustrate image signal buffering time according to changed channels of the broadcasting processing apparatus according to an exemplary embodiment of the present invention.

DETAILED DESCRIPTION OF EXEMPLARY EMBODIMENTS OF THE PRESENT INVENTION

Hereinafter, exemplary embodiments of the present invention will be described with reference to accompanying drawings, wherein like numerals refer to like elements and repetitive descriptions will be avoided as necessary. The present invention, however, may be realized as various types, and is not limited to the exemplary embodiments.

Figure 1:
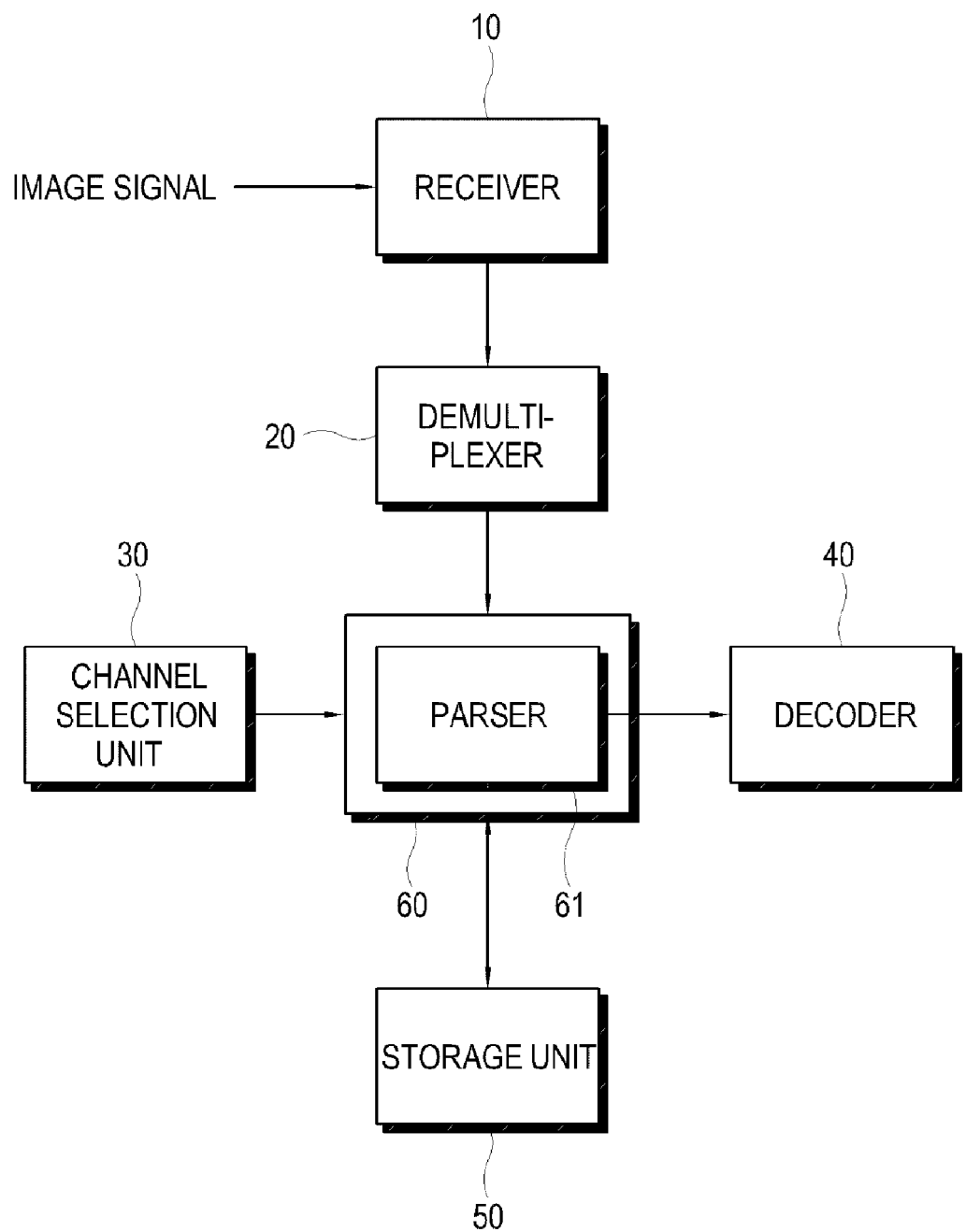
FIG. 1 is a control block diagram of a broadcasting processing apparatus according to an exemplary embodiment of the present invention.

FIG. 1 is a control block diagram of a broadcasting processing apparatus according to an exemplary embodiment of the present invention. As shown therein, the broadcasting processing apparatus includes a receiver 10, a demultiplexer 20, a channel selection unit 30, a decoder 40, a storage unit 50 and a controller 60 which controls the foregoing elements. The controller 60 includes a parser 61.

The receiver 10 selects a broadcasting channel according to a channel control signal of the controller 60 and receives a broadcasting signal corresponding to the selected channel. The broadcasting signal includes an image signal, an audio signal and a data signal. The receiver 10 includes an antenna (not shown), a tuner (not shown) to tune a broadcasting signal corresponding to a particular frequency of a desired channel and a low noise amplifier (not shown) to amplify the broadcasting signal inputted to the tuner. The broadcasting processing apparatus further includes a demodulator (not shown) to demodulate the modulated broadcasting signal into an original broadcasting signal.

The channel selection unit 30 is a user interface to select a channel. The channel selection unit 20 may include a button, a touch pad or a remote controller wirelessly communicating with the broadcasting processing apparatus. The channel selection unit 20 may include an input unit such as a key board and a mouse. The channel selection unit 20 may include a key to input numbers and text information, and a function key to set various functions. The channel selection unit 20 may further include a direction key to change a channel in a particular direction.

The demultiplexer 20 divides the demodulated broadcasting signal into the audio signal, the image signal and other data signals. Other data signals exclude the image signals and the audio signals included in the broadcasting signal, and may include program data, etc. The controller 60 informs broadcasting information, i.e. service (PID; product ID) to the demultiplexer 20. The demultiplexer 20 extracts target information from various information outputted by the demodulator according to the selected PID and divides it into the image signal and the audio signal.

The broadcasting processing apparatus may further include an input buffer (not shown) which stores the image signal up to the volume of data processible by the decoder 40. The input buffer may include a single unit to store both the image signal and the audio signal therein. Alternatively, the input buffer may include a unit to separately store the image signal and the audio signal.

The parser 61 parses the inputted image signal to extract image header information and decode the image signal. The parser 61 transmits the image signal that is substantially compressed, to the decoder 40. The controller 60 may further include a storage unit to buffer the image signal until an image signal corresponding to a single frame is received.

Figure 2A:
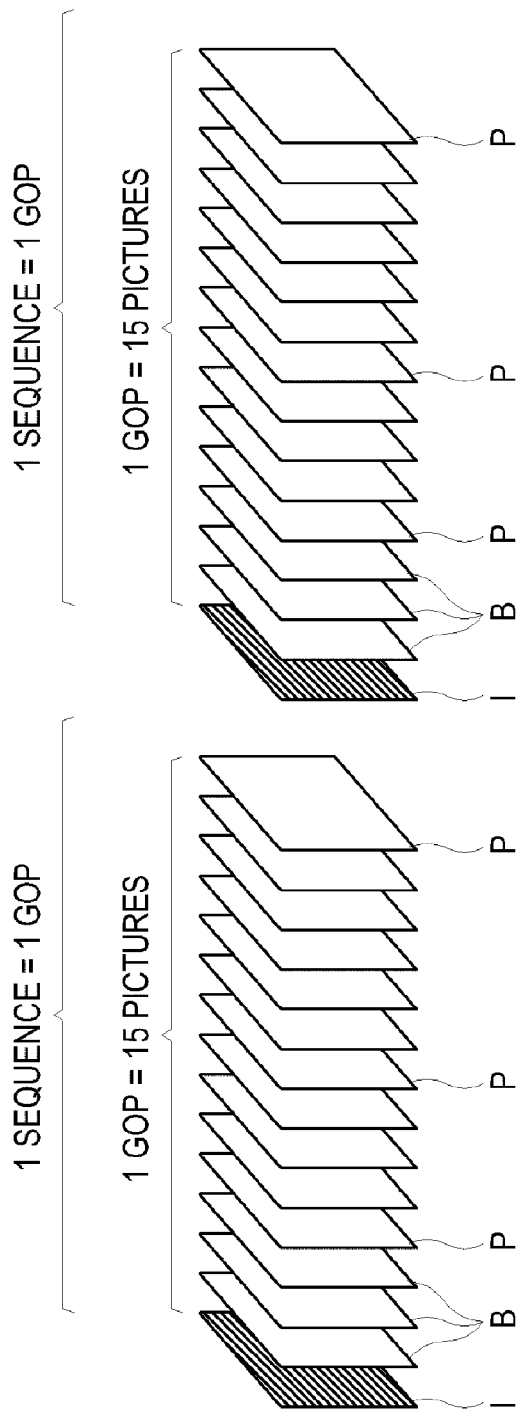
FIGS. 2A and 2B illustrate an image signal which is supplied to the broadcasting processing apparatus according to an exemplary embodiment of the present invention.
Figure 2B:
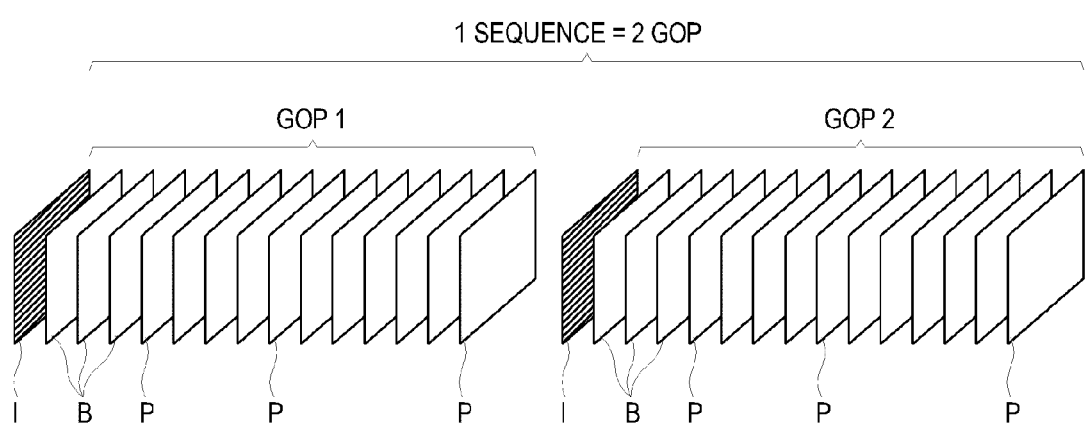

According to a motion picture expert group (MPEG) standard, approximately 15 frame pictures form a single group of pictures (GOP). At least one GOP forms a sequence. FIGS. 2A and 2B illustrate an image signal which is transmitted to the broadcasting processing apparatus according to the present embodiment. As shown therein, the frame pictures in the single GOP include an intra (I) picture, a prediction (P) picture and a bi-direction (B) picture. The single frame picture refers to two field images substantially displayed as two frames in the broadcasting processing apparatus. The I picture is similar to a JPEG image signal, and does not require a motion compensation operation. Meanwhile, the P picture image signal and B picture image signals are non-intra pictures, and compensate for a motion with reference to previous and subsequent picture images. Generally, the single GOP includes a single I picture, and a plurality of P and B pictures. The I picture is disposed in the beginning of the GOP. The sequence in FIG. 2A includes a single GOP while a sequence in FIG. 2B includes two GOPs. As described above, the single GOP includes approximately 15 frame pictures, i.e. 30 field images. It takes about 400 ms to 500 ms to decode and display the single GOP.

Turning back to the parser 61, the parser 61 parses the image signal and extracts the image header information. The image header information includes sequence header information, GOP header information supplied to the GOP header to support and search the I picture, a picture header of respective picture image information, and sequence end header information indicating the end of the sequence. The sequence header information includes picture size, frame rate, bit rate, chroma format, quantization information, picture coding types, etc. The sequence header information includes the image header information that should be necessarily supplied to decode the picture. If the sequence header information is not supplied, the image signal may not be decoded.

If the selection signal is inputted through the channel selection unit 30 to select the channel, the controller 60 determines whether the image signal supplied through the receiver 10 includes the sequence header information. If the sequence header information exists therein, the controller 60 stores the sequence header information in the storage unit 50. The storage unit 50 stores the sequence header information of at least one channel therein. If the same channel is reselected by repetitive channel selection and channel changes, the sequence header information of the storage unit 50 is updated. The information on the picture size included in the sequence header information is critical to decode the image signal. The picture size of the image signal supplied to the same channel is mostly identical. The stored sequence header information may be used to decode the image signal, and may be used as information to identify the broadcasting channels since it is different depending on broadcasting stations which transmit the image signal.

If the selection signal is inputted to select the channel and the sequence header information is not found from the received image signal, the controller 60 controls the decoder 40 to decode the image signal by using the sequence header information of the corresponding channel prestored in the storage unit 50.

Figure 3B:
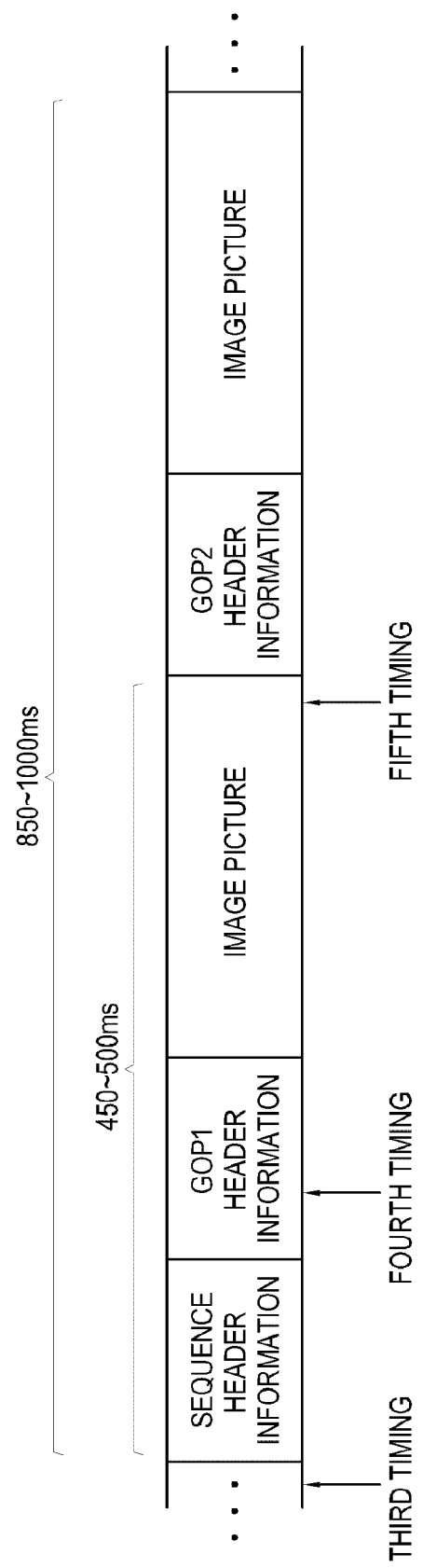

FIGS. 3A and 3B illustrate image signal buffering time according to changed channels of the broadcasting processing apparatus according to the present embodiment. FIGS. 3A and 3B schematically illustrate an image signal stream which is supplied from a broadcasting station to the broadcasting processing apparatus. As shown therein, the image signal includes sequence header information, GOP header information and an image picture that are sequentially supplied. The single GOP including 15 pictures is processed by the broadcasting processing apparatus in 450 ms to 500 ms. When the channel is selected or changed, the GOP is the unit that is randomly accessed.

FIG. 3A illustrates an image signal stream corresponding to the image signal in FIG. 2A while FIG. 3B illustrates an image signal stream corresponding to the image signal in FIG. 2B. In the case that a single GOP forms a sequence as shown in FIG. 3A, when a user selects or changes a channel at a first timing right before the sequence header information is supplied, the user may view the image signal in approximately 450 ms, which is video buffering verifier (VBV) delay time to buffer the image. If the channel is changed at a second timing after the stream of the sequence header information is transmitted, a user may view the image signal only after the subsequent sequence header information is supplied, i.e. in 900 ms to 950 ms combined with approximately 450 ms to 500 ms to receive the GOP stream and VBV delay time 450 ms. The situation becomes worse if the single sequence includes a plurality of GOPs as shown in FIG. 3B. If the channel is selected or changed at a third timing before the sequence header information is supplied, the image signal is displayed in approximately 450 ms. However, if the channel is selected or changed at a fourth or fifth timing after the stream of the sequence header information is transmitted, a user should wait for a long time until the image is displayed. In this case, a user may think there is a problem with the broadcasting processing apparatus even if the situation is due to display delay according to the property of the supplied image signal. To lessen delay in channel recognition of a user and to decode the image signal quickly, the controller 60 decodes the image signal by using the prestored sequence header information if the image header information extracted by the parser 61 does not include the sequence header information.

For example, if the channel is selected or changed at the fourth timing, the sequence header information is not supplied. If it is determined that the sequence header information is not supplied, the controller 60 determines whether the GOP header information exists. If the GOP header information exists, the controller 60 determines whether the storage unit 50 stores the sequence header information corresponding to the channel. If it is determined that the sequence header information is stored therein, the controller 60 controls to decode the image signal by using the stored sequence header information. A conventional broadcasting processing apparatus displays an image signal in 1300 ms to 1450 ms combined with 850 ms to 1000 ms until subsequent header information is supplied and 450 ms VBV delay time, if the channel is selected or changed at the fourth timing. Meanwhile, the broadcasting processing apparatus according to the exemplary embodiment of the present invention displays the image signal in 900 ms to 950 ms combined with 450 ms to 500 ms delay time until subsequent GOP 2 in which the random access is available, and 450 ms VBV delay time. That is, according to the exemplary embodiment, the image signal may be decoded by using the supplied GOP header information and the prestored sequence header information even if the sequence header information is not transmitted.

The controller 60 determines whether the sequence header information is valid and uses the sequence header information only after determining the validity thereof. To determine the validity of the sequence header information, the controller 60 decodes the I picture by using the stored sequence header information. If the I picture is decoded, e.g. an image block in 8*8 pixels is formed. The controller 60 determines whether the number of the image blocks from the decoded I picture corresponds to the preset number. If the preset number of image blocks is formed by decoding the I picture, the controller 60 may determine that the sequence header information is valid with respect to the picture size.

The decoder 40 decodes the inputted image signal to be displayed on a display unit (not shown). The decoder 40 may include a variable length decoder (not shown) which decodes the encoded image signal in a variable length into the original length, a reverse converter (not shown) to convert image data in two dimensional frequency domain into image data in two dimensional space domain and a motion compensation unit (not shown) to compensate for a motion of the image data. The configuration and role of the decoder 40 is consistent with the MPEG standard in this exemplary embodiment. However, it will be understood that the invention may be practiced using other standards.

The number of GOPs included in the sequence, the number of pictures included in the single GOP and the GOP decoding time are not limited to those described above. They may vary depending on broadcasting stations transmitting image signals, i.e. depending on channels.

Figure 4:
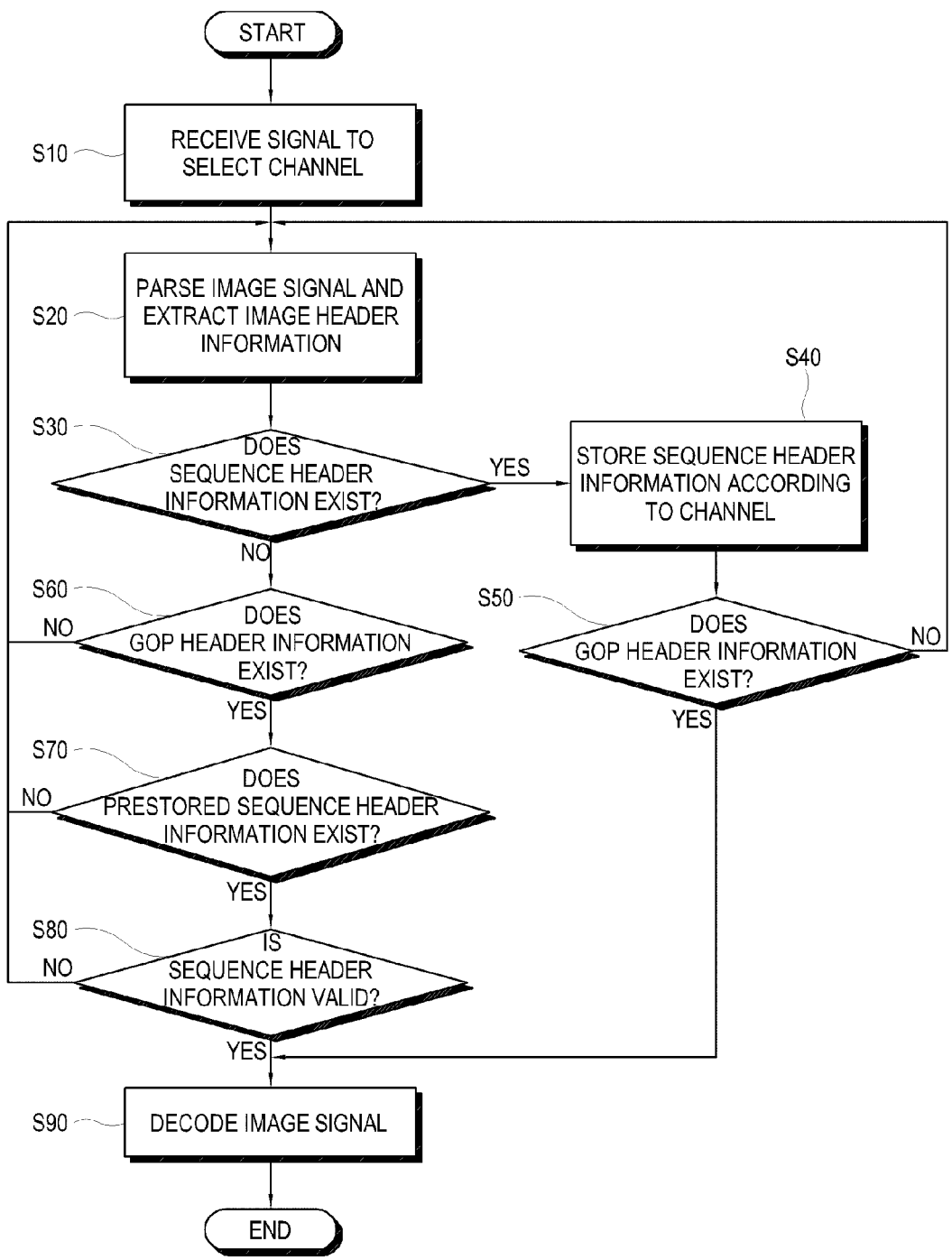
FIG. 4 is a control flowchart which describes a control method of the broadcasting processing apparatus according to an exemplary embodiment of the present invention.

FIG. 4 is a control flowchart which describes a control method of the broadcasting processing apparatus according to the exemplary embodiment.

The channel selection signal is transmitted to select the channel (S10). Then, the image signal supplied through the selected channel is parsed to extract the image header information (S20).

The controller 60 determines whether the extracted image header information includes the sequence header information (S30), and stores the sequence header information according to respective channels if the sequence header information exists (S40). The sequence header information corresponding to the same channel may be updated whenever supplied. The storage unit 50 stores the sequence header information of at least one channel. Then, the controller 60 determines whether the GOP header information exists (S50), and controls to decode the image signal if the GOP header information exists (S90). If it is determined that the GOP header information does not exist, the image signal is parsed again (S20).

If it is determined that the sequence header information does not exist, the controller 60 determines whether the GOP header information exists (S60). The controller 60 determines whether the sequence header information corresponding to the channel is stored in the storage unit 50 if the GOP header information exists (S70).

If it is determined that the sequence header information is prestored in the storage unit 50, the controller 60 determines the validity of the sequence header information (S80). To determine the validity of the sequence header information, the controller 60 decodes the I picture by using the prestored sequence header information, and determines whether the number of the image blocks from the decoded I picture corresponds to the preset number.

If it is determined that the number of the image blocks corresponds to the preset number, the controller 60 determines that the sequence header information is valid and decodes the image signal by using the prestored sequence header information (S90).

If the GOP header information does not exist at operation S60, if the sequence header information of the concerned channel is not stored at operation S70 or if the sequence header information is not valid at operation S80, the supplied image signal is parsed again at operation S20.

According to the present embodiment, the image signal is provided as an example of the broadcasting signal to be decoded, but not limited thereto. The present invention may be applicable to decode an audio signal. According to another exemplary embodiment, a storage unit may also store GOP header information as well as sequence header information. Thus, even if both the sequence header information and the GOP header information are not supplied, the image signal may be decoded by using prestored sequence header information. Then, the image signal decoding time according to channel changes may be further reduced.

As described above, an aspect of the present invention provides a broadcasting processing apparatus which changes a channel quickly, and a control method thereof.

Also, an aspect of the present invention provides a broadcasting processing apparatus which reduces decoding time of a broadcasting signal, and a control method thereof.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A broadcasting processing apparatus, comprising:
a receiver which receives an image signal;
a storage unit;
a decoder which decodes the image signal;
a channel selection unit which is provided to select a channel; and
a controller which determines whether sequence header information exists in the image signal received through the receiver and stores the sequence header information in the storage unit if the sequence header information exists in the image signal, and controls the decoder to decode the image signal by using sequence header information of the selected channel prestored in the storage unit if the sequence header information does not exist, if a selection signal to select the channel is inputted through the channel selection unit;
wherein the controller determines whether group of pictures (GOP) header information exists if the supplied image signal does not comprise the sequence header information, and controls the decoder to decode the image signal by using the stored sequence header information if the GOP header information exists;
wherein the controller determines validity of the sequence header information prestored in the storage unit and decodes the image signal if it is determined that the sequence header information is valid; and
wherein the image signal comprises an intra I picture, a prediction P picture and a bi-direction B picture, and the controller decodes the I picture by using the prestored sequence header information, and determines whether a number of image blocks from the decoded I picture corresponds to a preset number.

2. A broadcasting processing apparatus, comprising:
a receiver which receives an image signal;
a storage unit which stores sequence header information on at least one channel;
a decoder which decodes the image signal;
a channel selection unit which is provided to select a channel; and
a controller which determines whether the sequence header information exists in the image signal received through the receiver, and controls the decoder to decode the image signal by using prestored sequence header information of a selected channel if the sequence header information does not exist, when a selection to select the channel signal is inputted through the channel selection unit;
wherein the controller determines whether group of pictures (GOP) header information exists if the supplied image signal does not comprise the sequence header information, and controls the decoder to decode the image signal by using the stored sequence header information if the GOP header information exists;
wherein the controller determines validity of the sequence header information prestored in the storage unit, and decodes the image signal if it is determined that the sequence header information is valid; and wherein the image signal comprises an intra I picture, a prediction P picture and a bi-direction B picture, and the controller decodes the I picture by using the prestored sequence header information, and determines whether a number of image blocks from the decoded I picture corresponds to a preset number.

3. A method of controlling a broadcasting processing apparatus, comprising:

receiving a selection signal to select a channel;

parsing an image signal supplied through the selected channel and extracting image header information therefrom;

determining whether sequence header information exists in the extracted image header information;

storing the sequence header information according to channels if the sequence header information exists;

determining whether group of pictures (GOP) header information exists in the extracted image header information if the sequence header information does not exist, and decoding the image signal if the GOP header information exists;

determining validity of the prestored sequence header information;

wherein the image signal comprises an intra I picture, a prediction P picture and a bi-direction B picture, and the determining the validity of the sequence header information comprises decoding the I picture by using the sequence header information and determining whether the number of image blocks from the decoded I picture corresponds to a preset number.

* * * * *